Patented Aug. 16, 1938

2,126,773

UNITED STATES PATENT OFFICE 2,126,773

MANUFACTURE OF SYNTHETIC RESINS

Walther Heyn, Berlin, Germany, assignor to E. I. du Pont de Nemours & Company, Wilmington, Del., a corporation of Delaware No Drawing. Application May 1, 1935, Serial No. 19,301. In Germay May 4, 1934

5 Claims. (Cl. 260—8)

This invention relates to synthetic resins, and more particularly to improved resins of the polyhydric alcohol-polybasic acid type.

Resins made by the heat treatment of polyhydric alcohols and polybasic acids, with or without the presence of modifying agents such as fatty oil acids, monohydric alcohols, etc., are at a certain stage of the polymerization known as the B stage soluble in organic solvents and are useful as varnishes and pigmented coating compositions. When an effort is made, however, to produce condensation products with the lowest possible acid number, it is often impossible to stop at exactly the right degree of condensation. Resins are then formed which, when dissolved in organic solvents, gelatinize readily and have a relatively high viscosity so that the drying residue which they give is too small for practical varnish purposes. This fact furthermore renders impossible the making of milled alkyd resin pastes containing a high amount of pigments and being capable of storage for a longer period of time as they are usually made in the case of nitro cotton enamels. For, such alkyd resin pastes have to be made up to more dilute ready to use enamels as soon as possible as they readily gel irreversibly. Likewise alkyd resin flat enamels, containing large amounts of lamp black and the like, have also the tendency of gelling or storing.

Another undesirable property of the highly polymerized products formed in this way is that they give precipitates with solutions of other synthetic or natural resins, thus making it impossible to use varnish mixtures containing these resins. This incompatibility is a serious disadvantage since the inability to counterbalance certain undesirable properties of the polyhydric alcohol-polybasic acid resins by blending with other natural or synthetic resins, especially those of the urea-aldehyde type, materially restricts the use of the alkyd or polyhydric alcohol-polybasic acid resins.

A further undesirable property of the oil-modified alkyd resins, especially those modified by the addition of tung-oil, is the tendency to crinkle when applied in thicker layers on air-drying and even more so on oven-drying. Tung oil modified alkyd resins, furthermore, tend to crystallize in direct gas fired drying ovens or in indirectly heated drying ovens not completely insulated against the gases of combustion.

This invention has as an object a process for the manufacture of polyhydric alcohol-polybasic acid resins which are readily soluble in organic solvents without the undesirable tendency toward gelatinization. A further object is a process for increasing the compatibility with other resins of alkyd resins which in an untreated condition are not miscible with other resins. A further object consists in providing an oil-modified alkyd resin which does not crinkle on drying even when applied in thicker layers, and which when modified by tung-oil, does not crystallize, even when dried in a direct gas fired oven. A still further object is the manufacture of new and useful coating compositions.

I have discovered that polyhydric alcohol-polybasic acid resins can be improved, and the above mentioned defects largely overcome, by exposure of the resins to heat treatment in volatile solvents as will be more fully described hereinafter. This treatment apparently causes a certain degree of depolymerization which renders the resins more soluble in the usual solvents, while at the same time the resins lose their gelatinizing tendency and acquire the properties of forming thoroughly stable mixed solutions with other synthetic resins.

The following example, in which the parts are by weight, is illustrative of the methods used in carrying out my invention:

Example 1

Phthalic anhydride (30 parts), linseed oil fatty acids (30 parts), and glycerol (13 parts) are heated for several hours at 230° C. while passing in a current of carbon dioxide until the acid number has decreased to 15. The resinous reaction product is then dissolved while still hot in 60 parts xylene. The solution is then heated for 2 hours in an autoclave at 250° C.

The treated resin after separation from the solvent is completely soluble in gasoline and any other conventional solvents, as well as in the xylene in which the reaction is carried out, without any tendency to gelatinize. The treated resin, and its solution when mixed with a solution of urea aldehyde resin, mono- or dimethylolurea form no precipitate but yield a compatible, stable mixed solution of the two resins.

Example 2

An alkyd resin obtained in the usual manner from a mixture of 18 parts of phthalic anhydride
15 parts of linseed oil fatty acids
6 parts of tung oil and
9 parts of glycerol and having an acid number of 30, is dissolved in a mixture of 26 parts of high flash naphtha (boiling range 140–180° C.) and
26 parts of mineral spirits, having the flash point 21° C. and a boiling range of 150–200° C.

Said solution is heated for 45 minutes at 230° C. in a suitable pressure resisting apparatus. Coating of enamels produced with this solution do not crinkle and do not crystallize in drying in a direct gas fired drying oven.

Instead of carrying out the depolymerization in an autoclave, one may use other suitable types of apparatus, for instance metal coils inserted in a heating bath and provided with valves allowing to maintain the reaction mixture under pressure and the like.

The solvent in which the reaction is conducted must be so volatile that it evaporates from the film during drying at room temperature without leaving any residue. But on the other hand, keeping the requirement just mentioned in mind, the boiling point of the solvent should be as high as possible to prevent development of excessive pressure at the necessary high temperatures in the autoclave. Instead of xylene mentioned in the example, other readily volatile hydrocarbon solvents commonly used in the varnish industry, for example benzene, toluene, solvent naphtha, dipentene, various grades of gasoline, and especially the high test gasolines with flash points 21 and 30° C. may be employed. The vapor pressure of the solvent at room temperature must be so high that the solvent disappears completely during the formation of the varnish film and does not affect the properties of the final film. High boiling liquids or substances which combine chemically with the resin are unsuitable in the practice of this invention. The term "solvent" in this specification simply designates the usual inert substances which are called by this name in common practice in the varnish industry, namely, liquids which have the power of dissolving synthetic resins and other various raw materials but which escape completely from the varnish film by evaporation during the drying of the film.

It is quite difficult to clearly define these solvents. For this purpose one may make use of their boiling ranges. As a matter of fact, however, these boiling ranges do not absolutely characterize that property that is most important for the lacquer manufacture, namely the evaporation time. Hence, instead of defining the volatile solvents suitable for the purpose of this invention by their boiling ranges, they may be characterized by their evaporation time. When taking the evaporation time of pure toluene as standard value, the upper limit of evaporation time is reached by solvents having an evaporation time that is about fifty times as long as that of toluene. That means, solvents having an evaporation time that is 50 times longer than that of toluene, are not suitable for carrying out the process described and claimed. It is understood, however, that the lower limit of evaporation time is not limited by that of toluene; for, a number of suitable solvents, such as benzene, certain types of gasoline and the like, evaporate in a shorter period of time than toluene. It is, however, advisable, not to use solvents having a very short evaporation time, as with such solvents, as mentioned above, excessive pressure will be obtained at the necessary high temperature of depolymerization.

The resins treated in accordance with the practice of this invention may be made from any of the polyhydric alcohols, such as erythritol, sorbitol, etc., and polybasic acids, such as adipic, succinic, maleic, etc., conventionally used in the manufacture of resins of the polyhydric alcohol-polybasic acid type.

As the temperature, and hence the pressure, rises the time required for the reaction becomes shorter. Thus, if the example previously given is duplicated at 290° C. with corresponding pressure of 16 to 18 atmospheres, the time of treatment is reduced to only about 15 to 30 minutes.

Of course, it is understood that the optimum time of treatment is to be ascertained by simple tests and is depended upon the composition of the starting material and the desired properties of the treated product. It is, of course, necessary to avoid too long a treatment and too high a temperature because otherwise for instance the drying qualities of the oils are impaired.

It will be seen from the foregoing that I have developed a process for treating polyhydric alcohol-polybasic acid resins which improves these resins in the important properties of freedom from gelatinization, solubility, viscosity of solution, and compatibility with other resins, thus materially increasing the value and utility of alkyd type resins in the coating art.

In many cases it is sufficient in order to avoid the disadvantages mentioned above, to replace only a part of a solution of a normal non-treated alkyd resin by a solution of an alkyd resin according to this invention.

As many apparently widely different embodiments of this invention may be made without departing from the spirit and scope thereof, it is to be understood that I do not limit myself to the specific embodiments thereof except as defined in the appended claims.

I claim:

1. A process which comprises heating in a closed system under pressure an oil modified polyhydric alcohol-polybasic acid resin in solution in an inert solvent of the class consisting of aliphatic and aromatic hydrocarbon solvents, said solvent being one which is readily volatile at room temperature and which has an evaporation time not more than 50 times that of pure toluene, and continuing said heating until the resin solution when mixed with a solution of urea-aldehyde resin forms no precipitate but yields a compatible, stable mixed solution of the two resins.

2. A process for making a compatible mixture of oil modified polyhydric alcohol-polybasic acid condensation product and a resin of the class consisting of natural resins and urea-aldehyde resins, said process comprising heating in a closed system under pressure a solution of said condensation product in an inert solvent of the class consisting of aliphatic and aromatic hydrocarbon solvents, said solvent being one which is readily volatile at room temperature and which has an evaporation time not more than 50 times that of pure toluene, continuing said heating until the solution of said condensation product is capable of forming homogeneous solutions with said resin, and blending the polyhydric alcohol-polybasic acid condensation product thus treated with said resin.

3. A process for producing improved synthetic resins which comprises heating in a closed system a tung oil modified polyhydric alcohol-polybasic acid resin subject to crinkling in the film in an inert solvent of the class consisting of aliphatic and aromatic hydrocarbon solvents, said solvent being one which is readily volatile at room temperature and which has an evaporation time not more than 50 times that of pure toluene, and continuing said heating until the treated resin yields films which do not crinkle on drying in thick layers.

4. A resinous product yielding with solutions of urea-aldehyde resins compatible solutions forming no precipitate, said resinous product being obtained by heating in a closed system an oil modified polyhydric alcohol-polybasic acid resin under pressure in an inert solvent of the class consisting of aliphatic and aromatic hydrocarbon solvents, said solvent being one which is readily volatile at room temperature and which has an evaporation time not more than 50 times that of pure toluene.

5. A synthetic resin characterized by freedom from crinkling when drying in thick films, said resin comprising the product obtained by heating in a closed system a tung oil modified polyhydric alcohol-polybasic acid resin subject to wrinkling in the film in an inert solvent of the class consisting of aliphatic and aromatic hydrocarbon solvents, said solvent being one which is readily volatile at room temperature and which has an evaporation time not more than 50 times that of pure toluene.

WALTHER HEYN.